(12) United States Patent
Judkins

(10) Patent No.: US 7,182,120 B1
(45) Date of Patent: Feb. 27, 2007

(54) TABBED MULTI-CELLULAR SHADE MATERIAL

(76) Inventor: Ren Judkins, 46 Newgate Rd., Pittsburgh, PA (US) 15202

( * ) Notice: Subject to any disclaimer, the term of this patent is extended or adjusted under 35 U.S.C. 154(b) by 1204 days.

(21) Appl. No.: 09/703,372

(22) Filed: Oct. 31, 2000

Related U.S. Application Data

(63) Continuation of application No. 08/756,282, filed on Nov. 25, 1996, which is a continuation of application No. 08/412,875, filed on Mar. 29, 1995, now Pat. No. 5,630,898.

(51) Int. Cl.
E06B 9/06 (2006.01)

(52) U.S. Cl. .......... 160/84.05; 428/116; 156/197

(58) Field of Classification Search ........ 160/84.01, 160/84.04, 84.05; 156/193, 197; 428/116, 428/118
See application file for complete search history.

(56) References Cited

U.S. PATENT DOCUMENTS

| | | |
|---|---|---|
| 2,803,578 A | 8/1957 | Holland ............ 154/122 |
| 4,450,027 A | 5/1984 | Colson ............ 156/193 |
| 4,676,855 A | 6/1987 | Anderson ............ 156/193 |
| 4,685,986 A | 8/1987 | Anderson ............ 156/197 |
| 4,974,656 A | 12/1990 | Judkins ............ 160/84.1 |
| 4,999,073 A | 3/1991 | Kao et al. ............ 156/197 |
| 5,015,317 A | 5/1991 | Corey et al. ............ 156/197 |
| 5,043,038 A | 8/1991 | Colson ............ 156/193 |
| 5,106,444 A | 4/1992 | Corey et al. ............ 156/197 |
| 5,160,563 A | 11/1992 | Kutchmarek et al. ....... 156/197 |
| 5,193,601 A | 3/1993 | Corey et al. ............ 160/84.1 |
| 6,527,895 B1 * | 3/2003 | Palmer ............ 156/197 |

OTHER PUBLICATIONS physical article: Rosette.*

* cited by examiner

*Primary Examiner*—Blair M. Johnson
(74) *Attorney, Agent, or Firm*—Buchanan Ingersoll & Rooney PC

(57) ABSTRACT

A tabbed honeycomb structure or pleated panel is made from a stack of collapsed multi-cellular material. The stack is split at bond lines thereby forming the panels of pleated or honeycomb material having a joint tab on one face.

7 Claims, 3 Drawing Sheets

TABBED MULTI-CELLULAR SHADE MATERIAL

CROSS REFERENCE TO RELATED APPLICATIONS

This application is a continuation of U.S. patent application Ser. No. 08/756,282, filed Nov. 25, 1996, which is a continuation of application Ser. No. 08/412,875, filed Mar. 29, 1995, now U.S. Pat. No. 5,630,898.

BACKGROUND OF THE INVENTION

1. Field of the Invention

This invention relates to a pleated panel construction and method for the manufacture thereof and more particularly to a pleated shade construction, which results in an improved method for manufacturing variations of the well-known cellular shade constructions and other pleated shade constructions.

2. Description of the Prior Art

There are two basic types of folded window coverings. A first pleated type consists of a single layer of corrugated material. The other is a more complex cellular type where pleated layers are joined or folded strips are stacked to form a series of collapsible cells. This latter type is known to have favorable thermal insulation properties because of the static air mass which is trapped between the layers of material when the cells are in the expanded position. The single-layer type, on the other hand, is favored for its appearance in some cases, and is less expensive to manufacture. There is also a tabbed single layer of corrugated material which is disclosed in my U.S. Pat. No. 4,974,656.

There are two basic approaches to making cellular products and tabbed panels from a roll of fabric material. The first method pleats or bonds the material transverse to the length of the roll and the second method pleats or bonds longitudinally along its length.

The output of the transverse method cannot be wider than the roll width of the original material. The longitudinal method is limited in the types of patterns that can be printed on the material because alignment is random. The transverse methods have been limited to a single layer, a single tabbed layer or a triple layer where there are three continuous surfaces that create a panel of double cells.

There is a need to have a transverse process that can make a panel of single cells. There is also a need to increase the speed of production output of single, double and triple layers.

There are several methods of producing the cellular shades. Most similar to the pleated, single-panel method is Anderson U.S. Pat. No. 4,685,986. This method joins together two single-panel pleated lengths of material by adhesively bonding them together at opposing pleats. Other methods depart from this Anderson patent by joining together a series of longitudinally folded strips, rather than continuous sheets of pleated material. Such methods are shown in Colson U.S. Pat. No. 4,450,027, and in Anderson U.S. Pat. No. 4,676,855. In the Colson patent, strips of fabric are longitudinally folded into a U-shape and adhered on top of one another, whereas in the Anderson patent these strips are Z-shaped and are adhered in an interlocking position.

In U.S. Pat. No. 5,043,038 Colson discloses a method of cutting a honeycomb structure longitudinally to divide them into two tabbed single layer pleated panels. That honeycomb structure was formed from U-shaped strips as taught in Colson's U.S. Pat. No. 4,450,027 by a process of winding the foldable material around a base apparatus, applying glue to one face of the material and adhering each layer to the adjacent layer. This method tends to cause the tab to wrinkle because the stack is wrapped on a slightly curved mandrel. Also, because the material layers are wound in a stack, the length of the panels of final product are limited to the height of the wrapped stack and the ends of the stack are wasted.

Another method for making cellular shades is disclosed in U.S. Pat. Nos. 5,015,317; 5,106,444 and 5,193,601 to Corey et al. In that process fabric material is run through a production line that first screen prints the fabric and then applies thermoplastic glue lines at selected intervals. The fabric is then pleated, stacked, and placed in an oven to both set the pleats and bond the material at the glue lines.

There is a need for a method to utilize the current transverse processing equipment technology to make a larger variety of single and multi-layer panels at a faster rate.

SUMMARY OF THE INVENTION

The present method overcomes the problems and achieves the objectives indicated above by providing a method of manufacturing a pleated shade or a honeycomb structure by a means of splitting honeycomb or multicellular material into two or more tabbed, pleated panels or tabbed, cellular panels.

According to the teachings of the present invention, a stack of folded fabric is bonded to form a honeycomb structure having a series of cells connected together along bond lines. An interface region is present between adjacent cells which forms the bridge between horizontally adjacent stacks of cells. At least one bond line applied between adjacent fabric walls defines each interface region. These interface regions are split to form separate tabbed, pleated panels or separate panels of cells having tabs on one face between each pair of pleats. These tabs extending between each pleated panel or between individual cells, as the case may be, extend at least 1/16" in length. To simplify handling and to create a uniform appearance the tabs are identical in size resulting from a straight-line split along a distinct perpendicular plane, but the invention is not limited to this.

DESCRIPTION OF THE PREFERRED EMBODIMENTS

Figure 1:
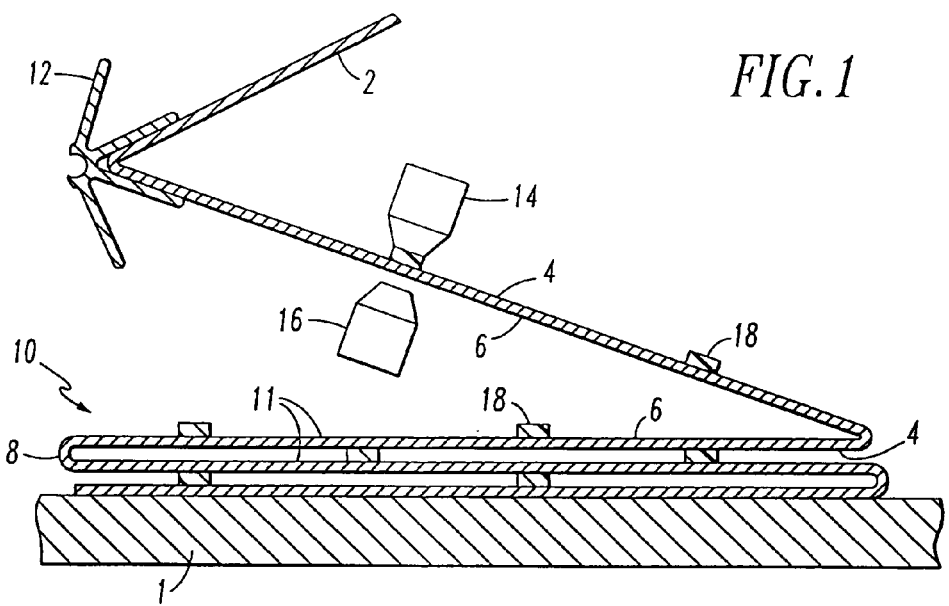
FIGS. 1 and 2 are diagrams showing how the honeycomb stack is formed.
Figure 2:
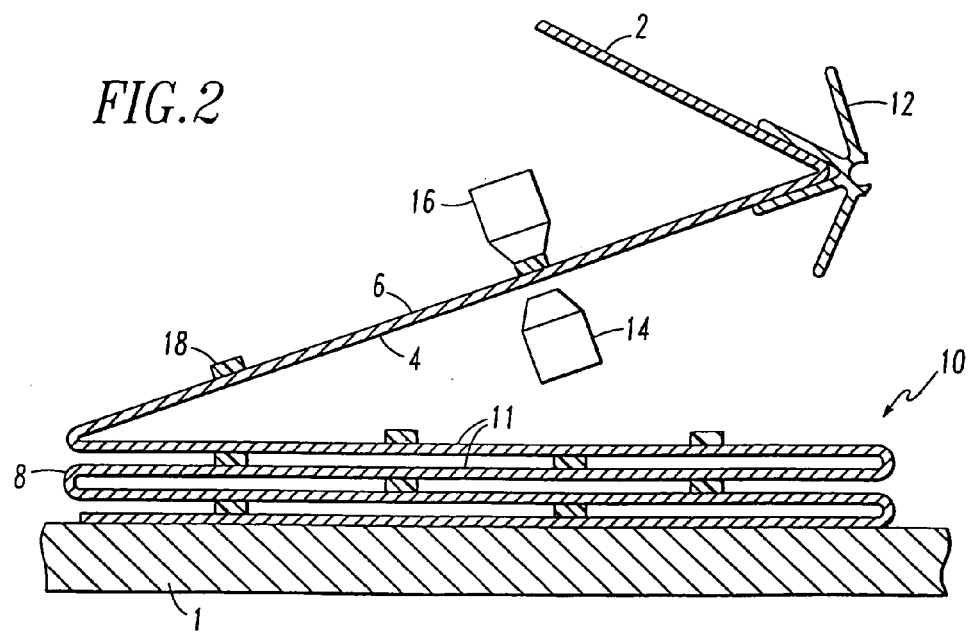

Referring to FIGS. 1 and 2, I provide a sheet of pleated fabric 2 which is folded on work surface 1 to form a fabric stack 10. Pleated fabric 2 is delivered to the work surface by a sprocket or other feed mechanism 12 which draws the fabric from a source of supply which is not shown. Glue applicators 14 and 16 apply bond lines 18 of hot melt glue on a surface 4 of the fabric. When the fabric is in the position shown in FIG. 1 surface 4 is facing upward. After the fabric has been laid from right to left across the length of stack 10, the fabric is folded as shown in FIG. 2. The movement of the stack relative to the fabric being supplied folds the fabric 2 back over the stack forming a pleat 8. Now surface 4 is facing down and opposite surface 6 is facing up. In that position glue applicator 16 applies lines of glue on surface 6. The fabric is laid across the stack from left to right. The process is repeated until a complete stack of fabric 10 has been created. That stack will then have sets of bond lines in vertical planes transverse to the pleat faces. Then, the stack is placed in an oven to melt the glue and bond the pairs of opposing faces together. If desired, irons could be provided to press the pleats after a selected number of passes. Although I prefer to create bond lines using an adhesive, particularly a hot melt adhesive, it is also possible to create the bond lines using a heat welder. After each pair of opposed pleat faces is laid they are welded together. I have found that a heat welder will bond two overlying sheets without affecting a third sheet below the sheets which are bonded.

In FIGS. 1 and 2 I show the adhesive lines being applied to pleated fabric. If desired, one can apply the adhesive to the fabric first and then pleat the fabric.

Figure 3:
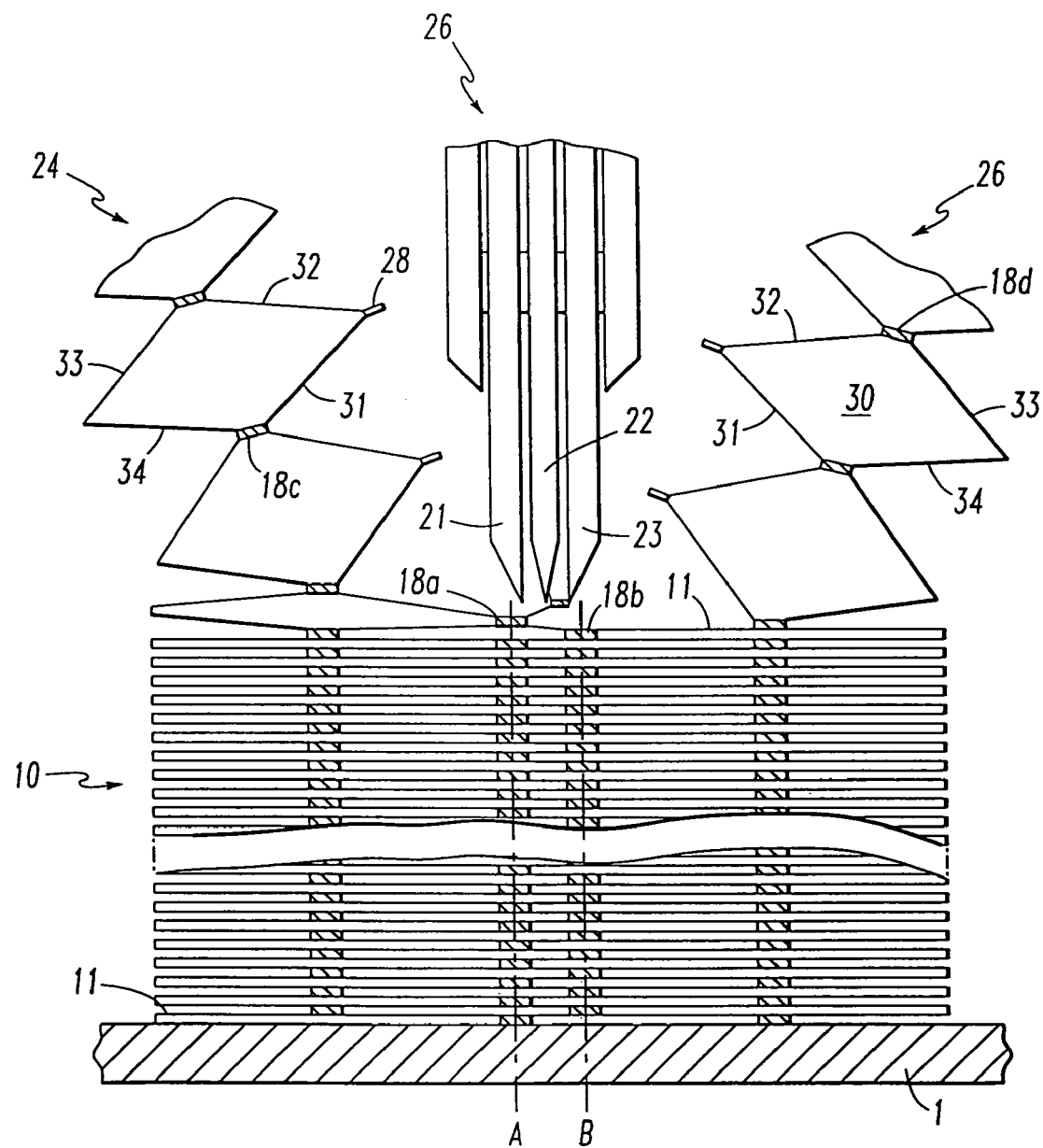
FIG. 3 is a diagram showing a triple cell honeycomb stack being split into two tabbed honeycomb panels according to the teachings of the present invention.

Referring now to FIG. 3, a splitter 20 is positioned above the stack so that blades 21 and 23 are positioned directly above adjacent glue lines 18a and 18b. Splitter 20 is then moved " through the stack thereby cutting the stack along the glue lines. These cuts form two single cell honeycomb panels 24 and 26. Preferably, the knife cuts between two planes of glue lines A and B so that after cutting the set of glue lines 18a in plane A are in one panel 24 and the set of glue lines 18b in plane B are in a second panel 26. Alternatively, the knife could cut through a plane of glue lines so that a portion of each glue line is in each panel. Each cell 30 has four primary side walls 31, 32, 33 and 34. Because of the method of manufacture a tab 28 has been formed between adjacent pleat faces or cell sidewalls 32 and 33 and contrast opposite side walls 33 and 34 meet to form a standard pleat. Adjacent cells are connected together by glue lines 18c and 18d. I prefer to provide a standard pleat face of ½" with a ¼" bridge formed by glue lines 18c and 18d. Preferably the tab has a width of 1/16" creating an overall width of 1 5/16". The region between glue lines 18 and 18b is preferably ⅛". Thus, the width of stack 10 would be 2¾" to make two panels of this preferred fabric size. Other standard sizes of pleat faces ranging from ¼" to about 1" can easily be made with this process. Indeed, the pleats can be any desired size.

I prefer that cutter 20 have two outside knives 21 and 23 and one inside knife as shown in FIG. 3. The use of two outside knives allows for a better cutting of the glue lines and for a greater tolerance for error of a glue plane placement and thickness. The center knife cuts the accordion pleat remnant in half so that the resulting smaller strips can easily be drawn off by vacuum.

Figure 4:
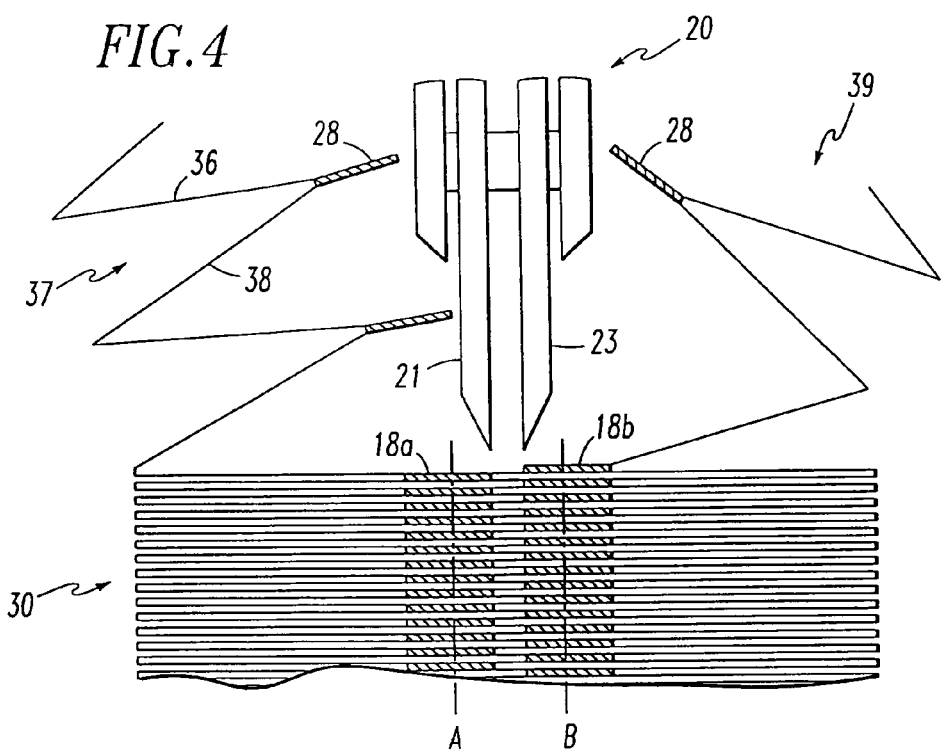
FIG. 4 is a diagram showing a double cell honeycomb stack being split into tabbed panels.

FIG. 4 shows a double cell honeycomb stack 30 being split. The cells are formed by sets of glue lines 18a and 18b in planes A and B. The double cells are split by knives 21 and 23 along a perpendicular plane through the glue lines. This method forms two panels of pleated material 32 and 34 each having a joint tab 28 on one face between each pair of adjacent pleat faces 36 and 38. The joint tabs 28 extending between each pair of pleats preferably should measure at least 1/16" in length.

Figure 5:
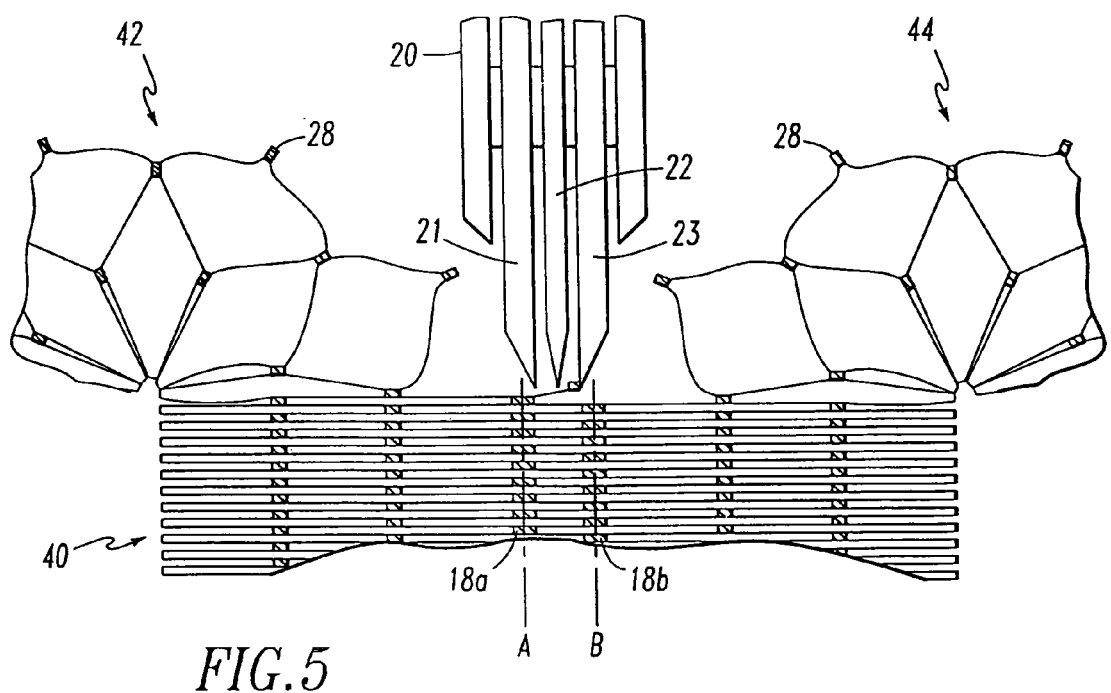
FIG. 5 is a diagram of a five cell honeycomb stack being split into two double honeycomb panels having tabs which are formed on one face of both panels.

FIG. 5 is a diagram of a five-cell honeycomb stack 40 being split. The five-cell honeycomb stack is split along a cutting plane parallel to the planes A and B containing glue lines 18a and 18b. This method forms two panels 42 and 44 of double cell honeycomb material having tabs 28 on one face. The splitter shown in FIG. 5, generally designated as 20, is comprised of a center blade 22 which pierces the stack 40 and two blades 21 and 23 that cut the interior edge of each alternating adhesive bond lines 18a and 18b.

Although I have shown the tabs being formed from a single glue line, tab 28 may be formed by either means of a single or a double bond or line of adhesive. The joint tabs in the separated panels in the figures are the same size. However, this is not necessary. Also, I have shown the glue lines extending to the ends of the tabs. But, this is not necessary.

A major advantage of the present method over the prior art is the gluing machine can make two, tabbed, pleated layers; two, tabbed, single-cells; or two tabbed, double-cell layers by changing the pump pressure and the orifice configuration on the glue heads. Such a change can be made in less than hour. Since the splitter is much faster and simpler than the gluing process, it is a less expensive machine and can handle the output of 3 or 4 gluing machines.

The stack of the present invention can be formed on several types of prior art pleating machines modified to have glue heads and to fold the fabric into the stack after gluing, or by simply modifying the glue heads on machines which have them to place more glue lines at different intervals. Such modified machines should be able to put out nearly twice the effective output than they did prior to modification.

Although I have shown certain present preferred embodiments of my method and the pleated and honeycomb structures made therefrom, it should be distinctly understood that my invention is not limited thereto, but may be variously embodied within the scope of the following claims.

I claim:

1. A multi-cellular pleated shade for covering a window having a front surface and a back surface opposed to one another comprising:
    a series of front cells each cell having an outer wall and an inner wall, the outer wall folded back to form a pleat and the front cells being connected to one another in a manner so that the pleats of all front cells are parallel and the outer walls of the front cells form at least a portion of the front surface;
    a series of back cells connected to the front cells, each back cell having an outer wall and an inner wall and a tab extending from the outer wall away from the inner wall; the back cells being connected to one another in a manner so that the tabs are parallel and the outer walls of the rear cells form at least a portion of the back surface.

2. The multi-cellular pleated shade for covering a window of claim 1 wherein the inner wall of at least one front cell is also the inner wall of at least one back cell.

3. The multi-cellular pleated shade for covering a window of claim 1 wherein the front cells and the rear cells form a double cell honeycomb material.

4. The multi-cellular pleated shade for covering a window of claim 1 wherein each back cell is comprised of two strips of shade material bonded together to form the tab and the outer wall.

5. The multi-cellular pleated shade for covering a window of claim 4 also comprising an adhesive bonding the two strips of shade material together.

6. The multi-cellular pleated shade for covering a window of claim 1 wherein each tab is formed by separate pieces of fabric bonded together by one of an adhesive, a hot melt adhesive and an ultrasonic bond.

7. The multi-cellular pleated shade for covering a window of claim 1 wherein each tab has a width of at least 1/16 inch.

* * * * *